United States Patent
Liu et al.

(10) Patent No.: US 10,140,523 B2
(45) Date of Patent: Nov. 27, 2018

(54) SETTING METHOD OF A COUNTING FLOW PATH, IMAGE MONITORING SYSTEM WITH SETTING FUNCTION OF THE COUNTING FLOW PATH AND RELATED COMPUTER-READABLE MEDIA

(71) Applicant: VIVOTEK INC., New Taipei (TW)

(72) Inventors: Cheng-Chieh Liu, New Taipei (TW); Wei-Ting Wu, New Taipei (TW); Kuan-Yu Lin, New Taipei (TW)

(73) Assignee: VIVOTEK INC., New Taipei (TW)

( * ) Notice: Subject to any disclaimer, the term of this patent is extended or adjusted under 35 U.S.C. 154(b) by 24 days.

(21) Appl. No.: 15/453,858

(22) Filed: Mar. 8, 2017

(65) Prior Publication Data
US 2017/0277958 A1    Sep. 28, 2017

(30) Foreign Application Priority Data
Mar. 25, 2016  (TW) .............................. 105109395 A

(51) Int. Cl.
*G06K 9/00* (2006.01)

(52) U.S. Cl.
CPC ..... *G06K 9/00771* (2013.01); *G06K 9/00785* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,466,684 B1* | 10/2002 | Sasaki | ................ | G06K 9/00798 340/435 |
| 7,161,616 B1* | 1/2007 | Okamoto | ................. | B60R 1/00 348/148 |
| 8,411,900 B2* | 4/2013 | Naka | ................... | G06K 9/00208 340/436 |
| 8,825,355 B2* | 9/2014 | Nakano | .................... | B62D 6/00 180/422 |
| 9,286,518 B2* | 3/2016 | Gornick | ............. | G06K 9/00771 |
| 2004/0073364 A1* | 4/2004 | Jung | ...................... | G01C 21/30 701/469 |

(Continued)

FOREIGN PATENT DOCUMENTS

| | | |
|---|---|---|
| CN | 104021570 A | 9/2014 |
| TW | 200727204 | 7/2007 |
| TW | 201324383 A1 | 6/2013 |

*Primary Examiner* — Anand P Bhatnagar
(74) *Attorney, Agent, or Firm* — Winston Hsu

(57) ABSTRACT

A setting method of a counting flow path is applied to an image monitoring system and a related computer-readable media. The counting flow path is utilized to determine whether an object passes through a monitoring area. The setting method includes drawing two boundaries on a video frame correlative to the monitoring area to define the counting flow path, detecting relative position between a first angle control point and a second angle control point of the counting flow path, adjusting an angle formed by virtual lines stretching from the boundaries according to the relative position between the said angle control points, and utilizing an initial point and a final point detected by the counting flow path while the objects moves into or out of the counting flow path to determine whether the object passes through the counting flow path.

20 Claims, 14 Drawing Sheets

(56) References Cited

U.S. PATENT DOCUMENTS

| | | | |
|---|---|---|---|
| 2004/0183926 A1* | 9/2004 | Fukuda | H04N 5/265 348/239 |
| 2006/0158730 A1* | 7/2006 | Kira | H04N 13/133 359/462 |
| 2009/0010493 A1* | 1/2009 | Gornick | G06K 9/00771 382/103 |
| 2009/0315978 A1* | 12/2009 | Wurmlin | G06T 5/005 348/43 |
| 2013/0163883 A1* | 6/2013 | Takemoto | G06K 9/00382 382/199 |
| 2013/0190982 A1* | 7/2013 | Nakano | B62D 6/00 701/41 |
| 2013/0190985 A1* | 7/2013 | Nakano | B62D 6/00 701/41 |
| 2016/0224840 A1* | 8/2016 | Gornick | G06K 9/00771 |

* cited by examiner

SETTING METHOD OF A COUNTING FLOW PATH, IMAGE MONITORING SYSTEM WITH SETTING FUNCTION OF THE COUNTING FLOW PATH AND RELATED COMPUTER-READABLE MEDIA

BACKGROUND OF THE INVENTION

1. Field of the Invention

The present invention relates to an image monitoring system with a setting function applied to a counting flow path and a related computer readable medium, and more particularly, to an image monitoring system with a setting function applied to a counting flow path and a related setting method applied to the counting flow path and a related computer readable medium.

2. Description of the Prior Art

The flow rate analysis technique is widespread applied to visitor statistics of a market and a scenic resort, or applied to vehicle statistics of a roadway and a car park. The pedestrian or the vehicle passes through a specific entrance can be represented as a flow rate datum. For determining whether an object (which means the pedestrian and the vehicle) passes through the specific entrance, the conventional flow rate analysis technique draws a detection line on the entrance within the image frame, and takes count of the object while the said object passes through the detection line. However, the conventional flow rate analysis technique cannot recognize a behavior of the object after passing through the detection line, for example, the object which moves in straight or makes a turn after passing through the detection line both conform to the flow rate counting standard, but the user may not take count of the object making the turn while passing through the detection line. Therefore, design of a brand-new flow rate analysis technique capable of effectively recognizing a moving distance and a moving direction of the object relative to the entrance via adaptive adjustment according to any type of the entrance belongs to an important issue of the related monitoring industry.

SUMMARY OF THE INVENTION

The present invention provides an image monitoring system with a setting function applied to a counting flow path, a related setting method applied to the counting flow path and a related computer readable medium for solving above drawbacks.

According to the claimed invention, a setting method applied to a counting flow path is disclosed, and the counting flow path is utilized to determine whether an object passes through a monitoring area. The setting method includes steps of drawing two boundaries on a video frame correlative to the monitoring area to define the counting flow path, detecting relative position between a first angle control point and a second angle control point on the counting flow path, adjusting an angle formed by virtual lines stretching from the two boundaries according to the relative position between the first angle control point and the second angle control point, and utilizing an initial point and a final point detected by the counting flow path while the objects moves into and out of the counting flow path to determine whether the object passes through the counting flow path.

According to the claimed invention, an image monitoring system with a setting function applied to a counting flow path is disclosed, and the counting flow path is utilized to determine whether an object passes through a monitoring area. The image monitoring system includes an image capturing device, an input device and an operational controlling device. The image capturing device is adapted to capture a video frame. The input device is adapted to input a control command upon a pattern on the video frame. The operational controlling device is electrically connected to the image capturing device and the input device. The operational controlling device is adapted to set criteria of judgment about the counting flow path on the video frame by steps of drawing two boundaries on a video frame correlative to the monitoring area to define the counting flow path, detecting relative position between a first angle control point and a second angle control point on the counting flow path, adjusting an angle formed by virtual lines stretching from the two boundaries according to the relative position between the first angle control point and the second angle control point, and utilizing an initial point and a final point detected by the counting flow path while the objects moves into and out of the counting flow path to determine whether the object passes through the counting flow path.

According to the claimed invention, a computer readable medium having a plurality of computer-executable commands is disclosed, and the command is adapted to drive a computer to execute steps of drawing two boundaries on a video frame correlative to the monitoring area to define the counting flow path, detecting relative position between a first angle control point and a second angle control point on the counting flow path, adjusting an angle formed by virtual lines stretching from the two boundaries according to the relative position between the first angle control point and the second angle control point, and utilizing an initial point and a final point detected by the counting flow path while the objects moves into and out of the counting flow path to determine whether the object passes through the counting flow path.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
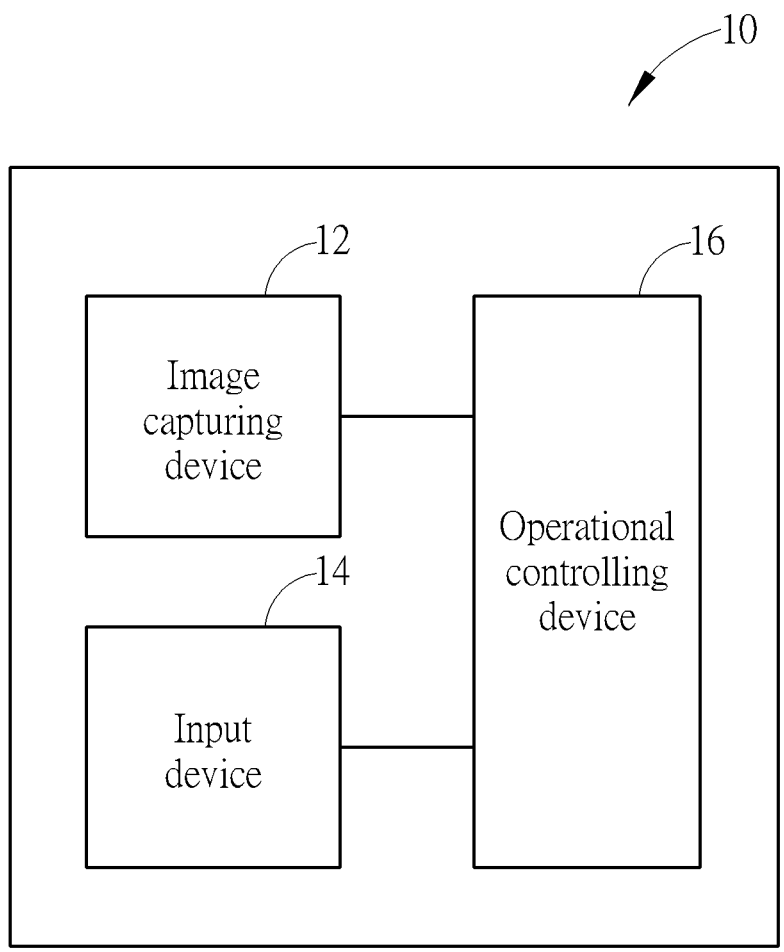
FIG. 1 is a functional block diagram of an image monitoring system according to an embodiment of the present invention.

Please refer to FIG. 1. FIG. 1 is a functional block diagram of an image monitoring system 10 according to an embodiment of the present invention. The image monitoring system 10 has a setting function applied to a counting flow path, and the counting flow path is utilized to determine whether an object passes through a monitoring area. The image monitoring system 10 includes an image capturing device 12, an input device 14 and an operational controlling device 16. The image capturing device 12, such as a security surveillance camera, is utilized to capture a video frame correlative to the monitoring area. The input device 14 utilizes the webpage or backend software to apply a control command to a pattern on the video frame, for example, two boundaries can be drawn upon the video frame to form the counting flow path. The operational controlling device 16 is electrically connected to the image capturing device 12 and the input device 14. The operational controlling device 16 executes the setting method applied to the counting flow path, so as to determine criteria of judgment about the counting flow path on the video frame.

It should be mentioned that the setting method applied to the counting flow path of the present invention can be any kind of computer readable medium. The foresaid setting method can be compiled as program codes stored inside the computer readable medium. Therefore, the computer readable medium has a plurality of computer-executable commands, which drive the computer to execute the setting method applied to the counting flow path. The computer readable medium can be all kinds of medium applied to the operational controlling device 16 or the image capturing device 12. The computer readable medium is selected from, but not limited to, a group consisting of the random access memory (RAM), the read-only memory (ROM), the electrically-erasable programmable read-only memory (EEPROM), the flash memory, other memory technology, any magnetic storage device, and a combination thereof.

Figure 2:
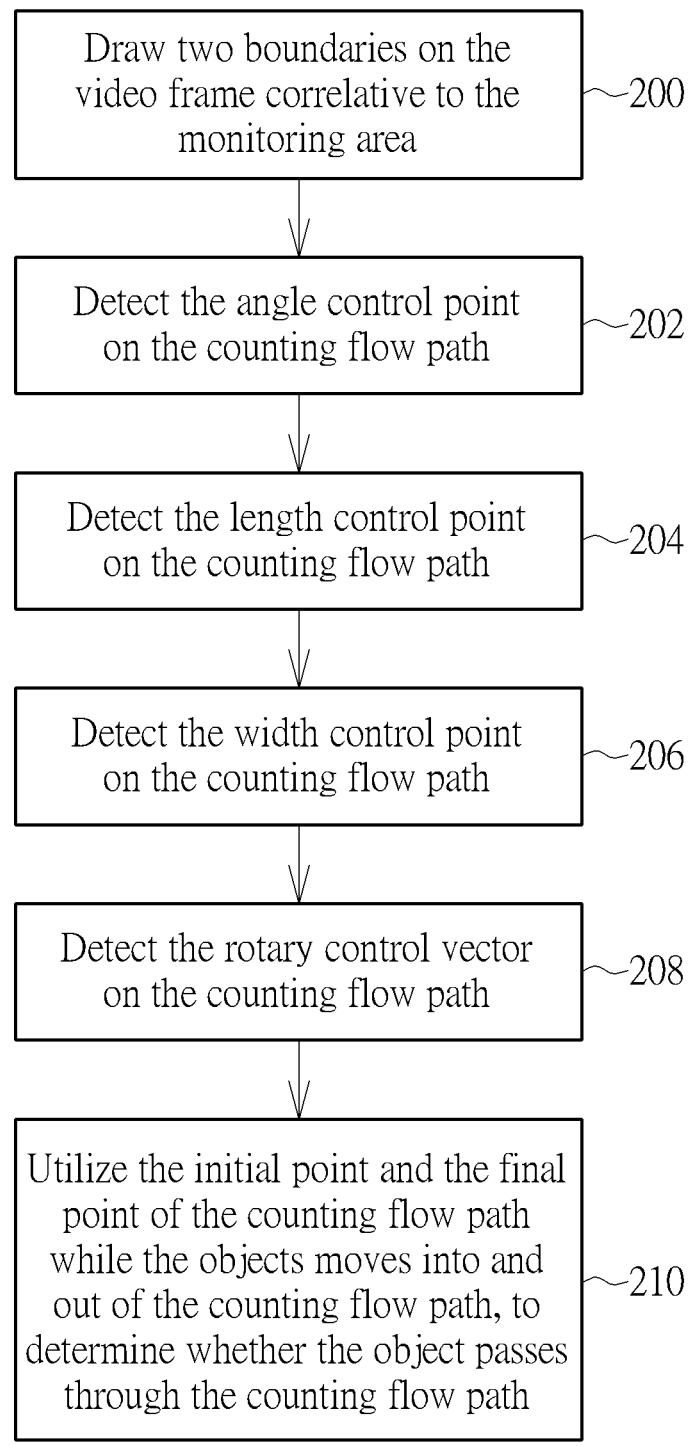
FIG. 2 is a flow chart of the counting flow path setting method according to the embodiment of the present invention.
Figure 3:
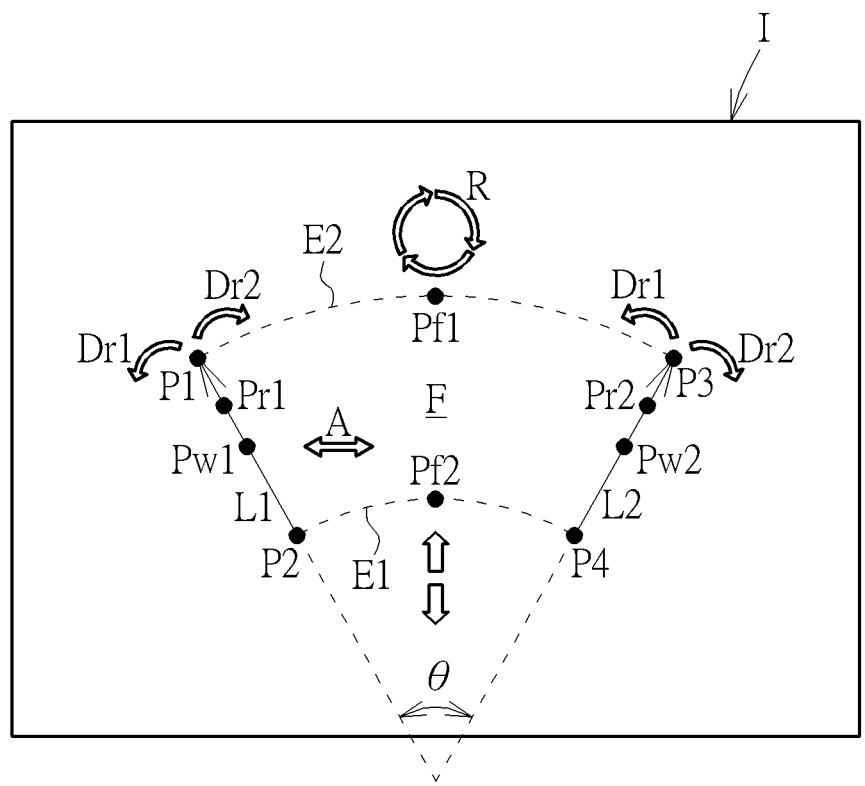
FIG. 3 to FIG. 11 respectively are diagrams of the video frame marked with the counting flow path according to different embodiments of the present invention.
Figure 4:
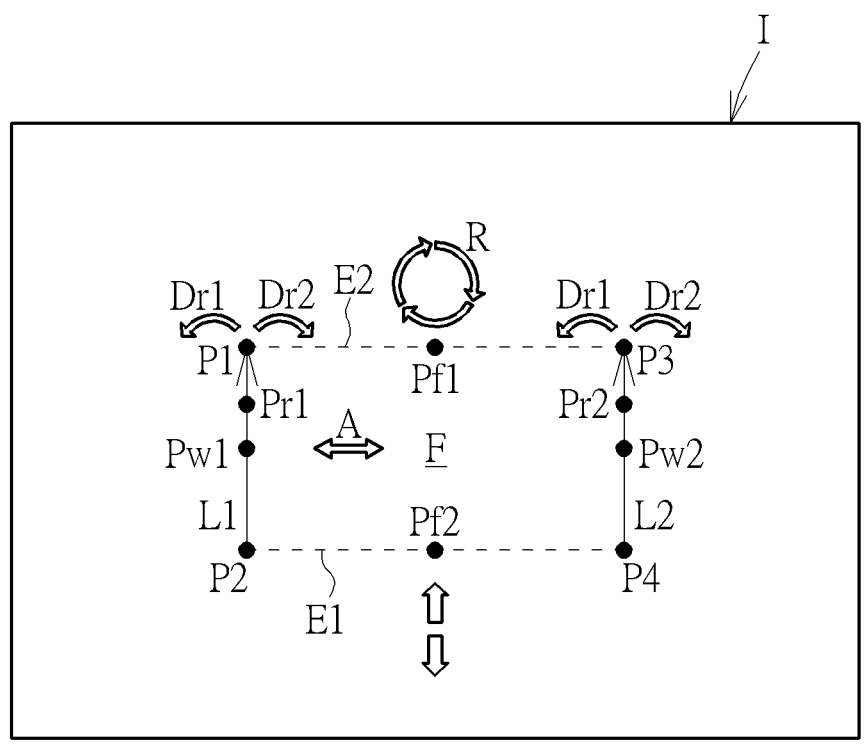
Figure 5:
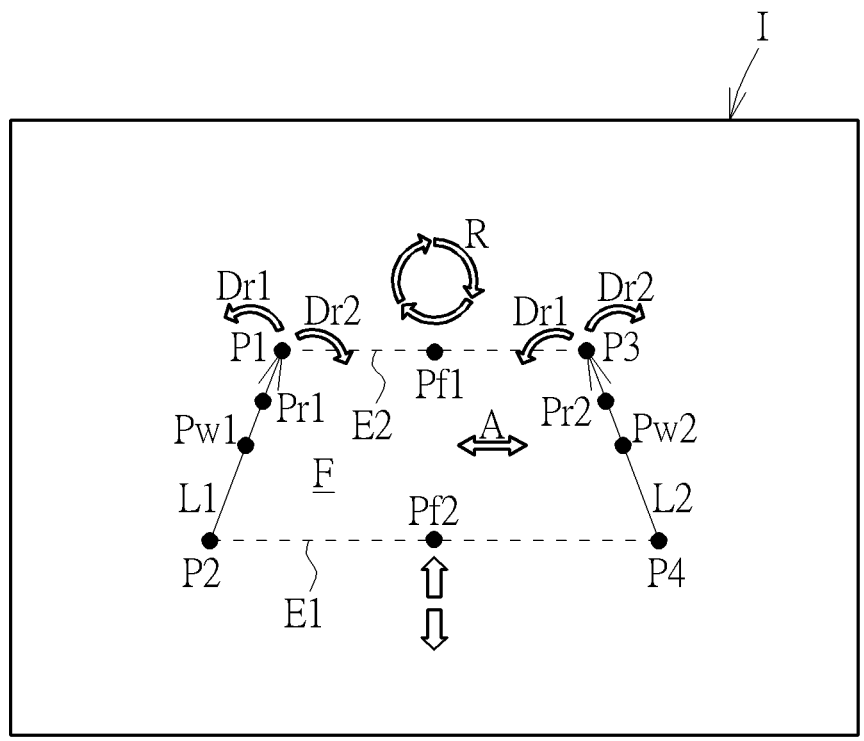

Please refer to FIG. 2 to FIG. 11. FIG. 2 is a flow chart of the counting flow path setting method according to the embodiment of the present invention. FIG. 3 to FIG. 11 respectively are diagrams of the video frame I marked with the counting flow path F according to different embodiments of the present invention. First, step 200 is executed that the two boundaries L1 and L2 are drawn on the video frame I correlative to the monitoring area, and the setting method utilizes the two boundaries L1 and L2 to define the counting flow path F. In steps 202, 204, 206 and 208, the setting method detects the angle control point, the length control point, the width control point and the rotary control vector on the counting flow path F to ascertain reference data about the counting flow path F, such like position of endpoints P1, P2, P3 and P4 on the two boundaries L1 and L2. While setting of the counting flow path F is completed, step 210 is executed to utilize an initial point and a final point detected by the counting flow path while the objects moves into and out of the counting flow path F, to determine whether the object passes through the counting flow path F on the video frame I. It should be mentioned that step of determining whether the object passes through the counting flow path F on the video frame I and counting computation of the counting flow path F can be computed by the operational controlling device 16 according to the image captured by the image capturing device 12 and the related reference data of the counting flow path F, or the operational controlling device 16 may transmit the related reference data of the counting flow path F to the image capturing device 12 and the image capturing device 12 executes computation according to the captured image and the related reference data of the counting flow path F.

The setting method of the present invention utilizes the opposite endpoints of the two boundaries L1 and L2 to respectively define an inlet border E1 and an outlet border E2 of the counting flow path F. By way of the counting flow path setting method in the present invention, the inlet border E1 can be varied by adjustment of those control points and the control vector, so as to be smaller than the outlet border E2 (which can be shown in FIG. 3), or be equal to the outlet border E2 (which can be shown in FIG. 4), or be greater than the outlet border E2 (which can be shown in FIG. 5).

Figure 6:
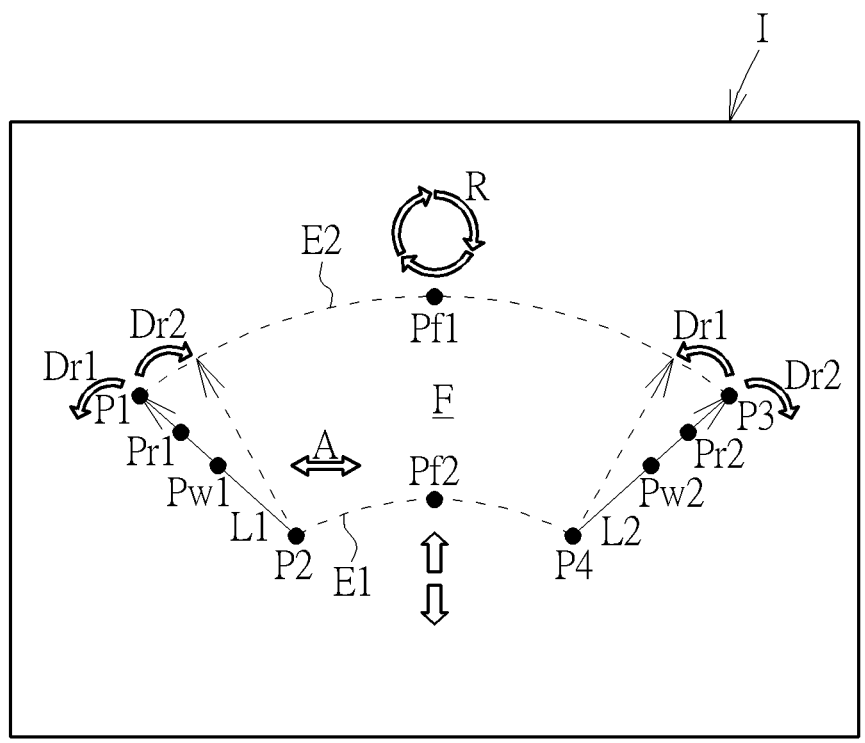
Figure 7:
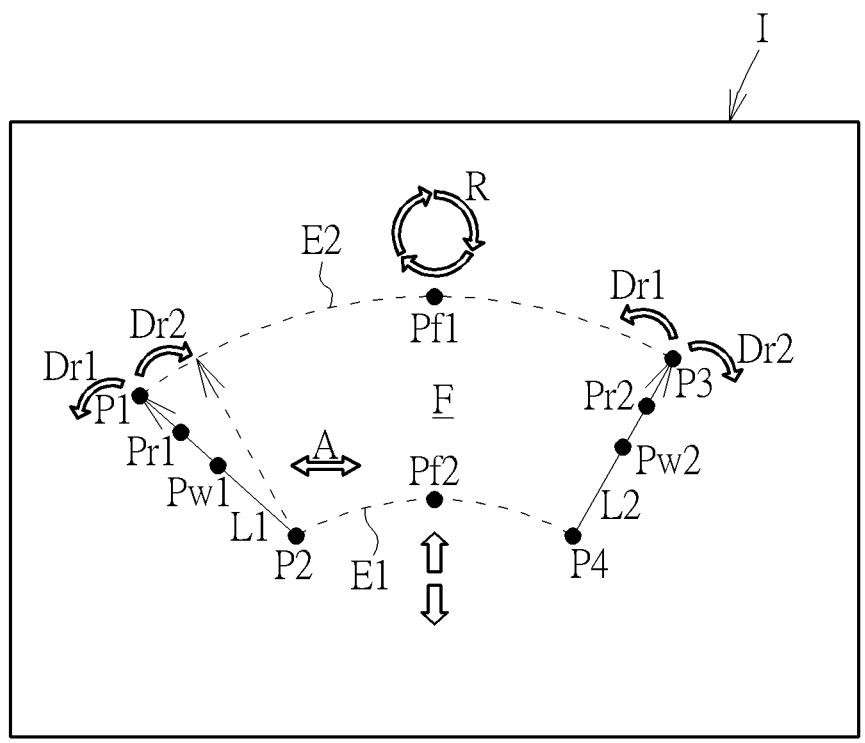

The setting method of the present invention can choose one or several steps from steps 202~208 for execution, and execution sequence of those steps is not limited to the embodiment mentioned above, which depends on actual demand. In step 202, the setting method detects relative position between a first angle control point Pr1 and a second angle control point Pr2 on the counting flow path F to adjust an angle θ formed by virtual lines stretching from the two boundaries L1 and L2. The first angle control point Pr1 and the second angle control point Pr2 can be located at any position on the boundary L1 and L2, and are not limited to position of the endpoints P1 and P3. The angle θ is utilized to represent a covering range of the fan-shaped counting flow path F displayed on the video frame I. While the input device 14 is operated to adjust one of the first angle control point Pr1 and the second angle control point Pr2, the two boundaries L1 and L2 may be oppositely moved to change the angle θ between the stretched virtual lines. As shown in FIG. 6, while the first angle control point Pr1 is operated to move along the direction Dr1, the boundary L1 is rotated at the direction Dr1 via the endpoint P2, and the boundary L2 is synchronously rotated at the direction Dr2 via the endpoint P4. Further, while one of the first angle control point Pr1 and the second angle control point Pr2 is operated, one of the boundaries is rotated, and the other boundary is kept at the steady position; as shown in FIG. 7, the first angle control point Pr1 is rotated to move along the direction Dr1, the boundary L1 is rotated to left, and the boundary L2 is static.

Figure 8:
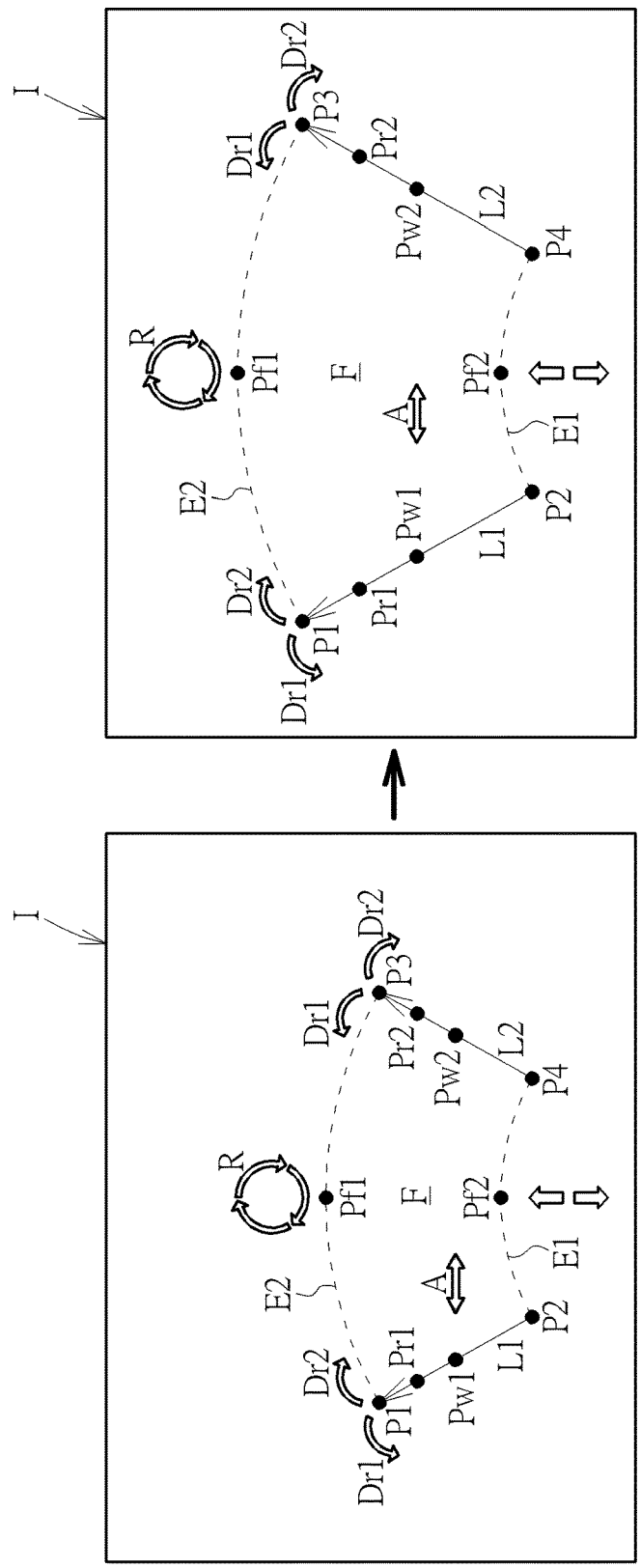
Figure 9:
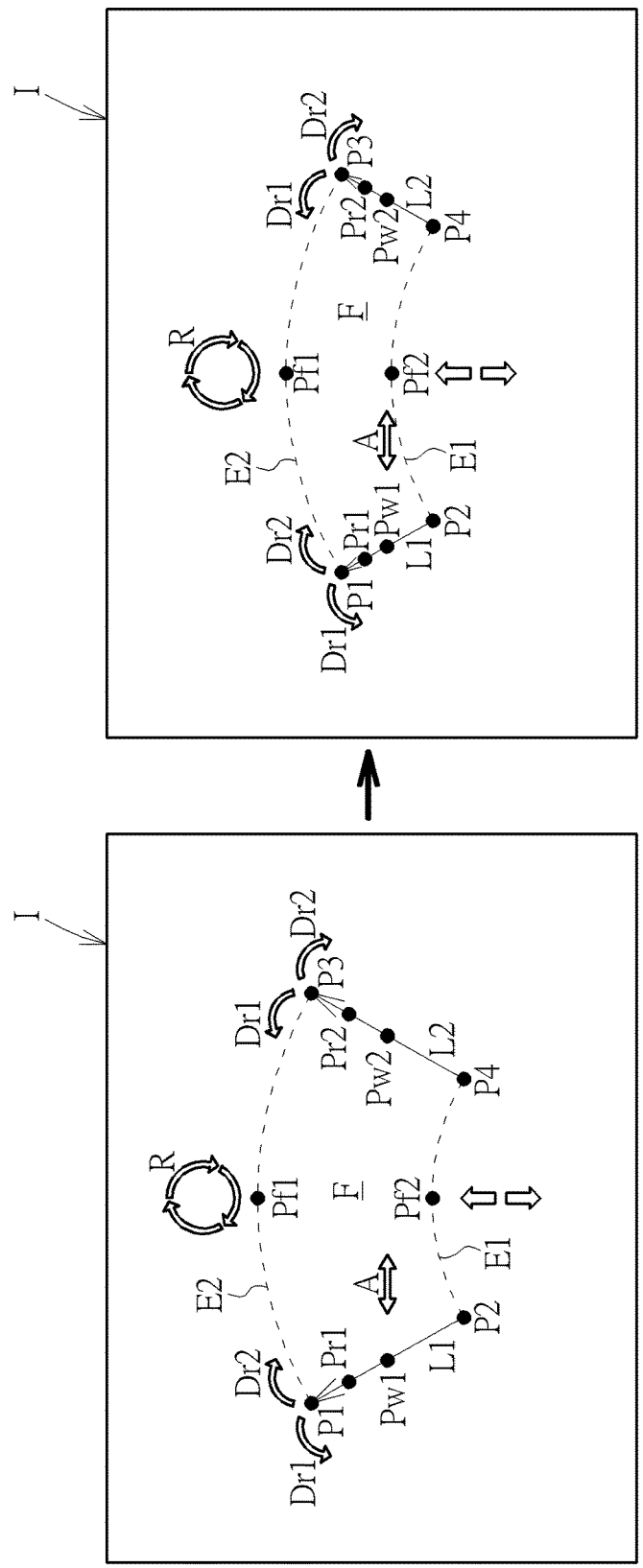
Figure 10:
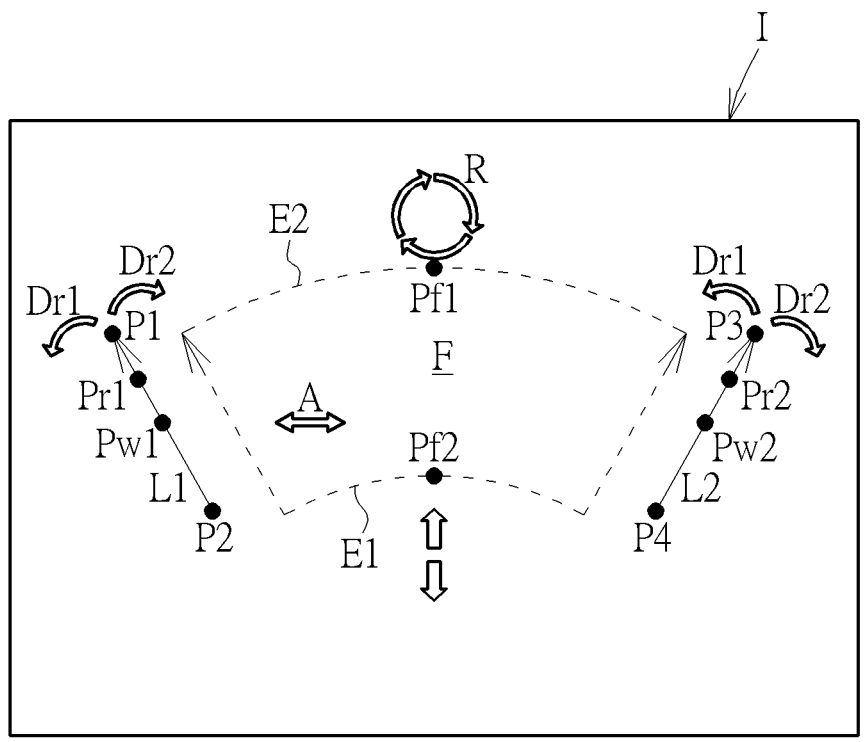
Figure 11:
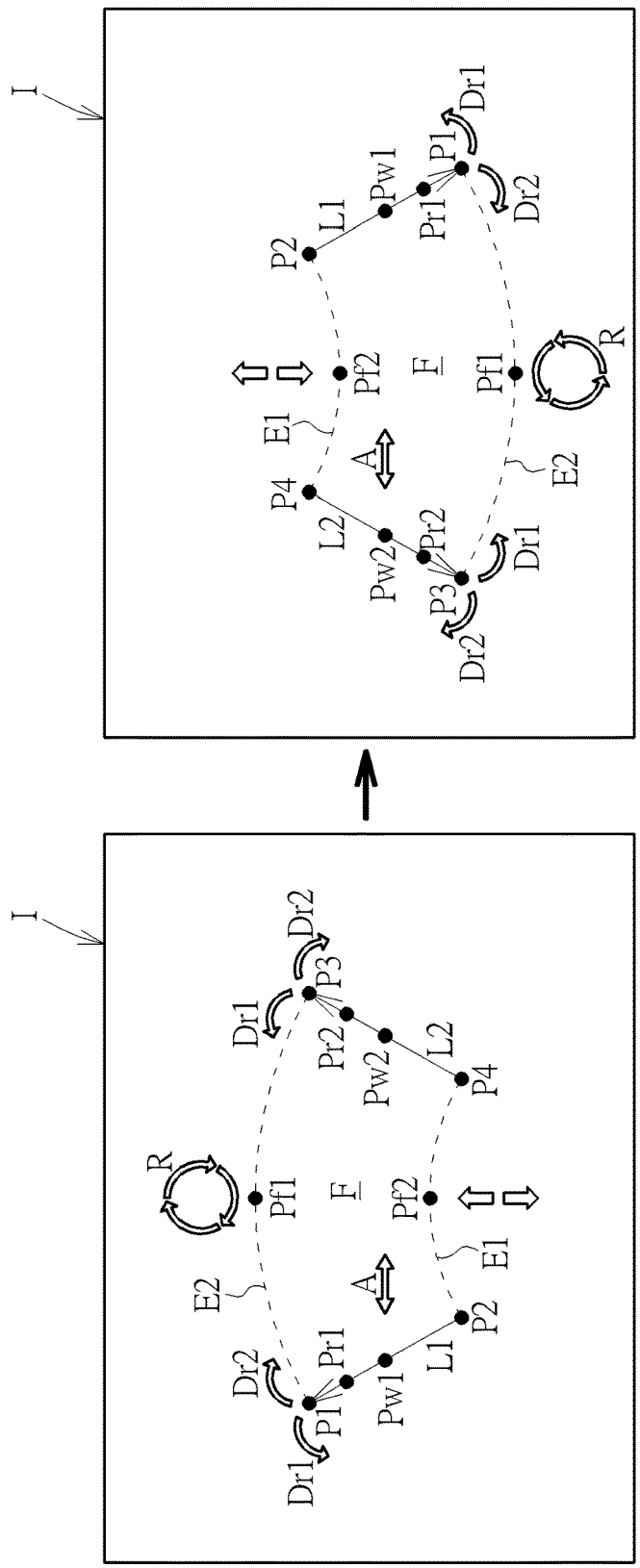

In step 204, the setting method detects a movement of the first length control point Pf1 relative to the second length control point Pf2 on the counting flow path F, so as to adjust lengths of the two boundaries L1 and L2 accordingly. Step 202 and step 204 are similar, which means the second length control point Pf2 can be static while the first length control point Pf1 is operated to move relative to the second length control point Pf2, as shown in FIG. 8; or the second length control point Pf2 may be moved opposite to a moving direction of the first length control point Pf1 while the first length control point Pf1 is operated to move relative to the second length control point Pf2, as shown in FIG. 9. In Step 206, the setting method detects a movement of a first width control point Pw1 relative to a second width control point Pw2 on the counting flow path F, so as to accordingly adjust an interval between the two boundaries L1 and L2, as shown in FIG. 10. A dotted pattern shown in FIG. 10 is represented as the unadjusted boundary L1 and L2, and a solid pattern shown in FIG. 10 is represented as the boundary L1 and L2 adjusted along the moving direction A. In step 208, the setting method detects an orientation of a rotary control vector R on the counting flow path F, so as to adjust the rotary angle of the counting flow path F relative to a specific reference point on the video frame I according to the orientation, as shown in FIG. 11.

Moreover, position of the counting flow path F on the video frame I can be arbitrarily adjusted in accordance with the user's demand. The user may select and shift a pattern correlative to the counting flow path F on the video frame I via the input device 14, and the setting method can adjust position of the counting flow path F on the video frame I according to a shifting command generated by the input device 14 while detecting that any pixel within the pattern on the counting flow path F is shifted.

Figure 12:
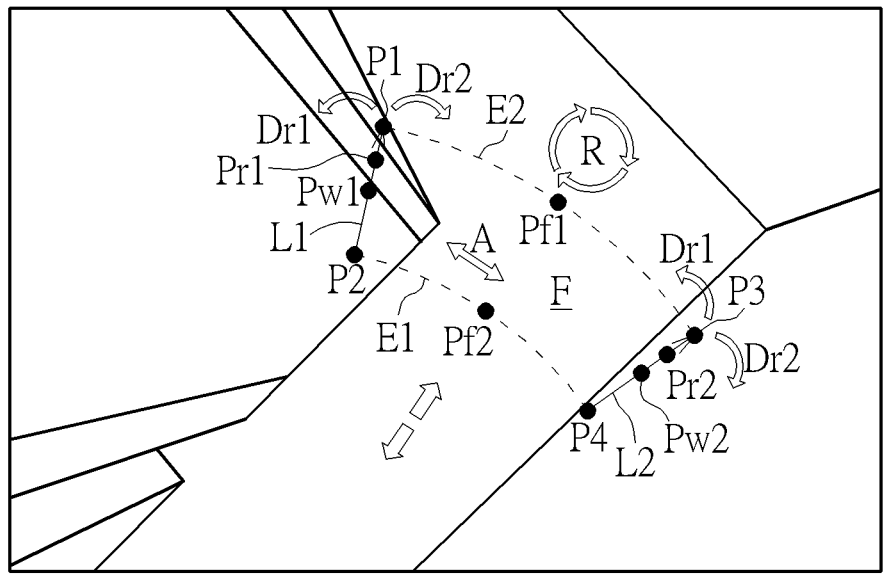
FIG. 12 and FIG. 13 respectively are application diagrams of the counting flow path setting method according to different embodiments of the present invention.
Figure 13:
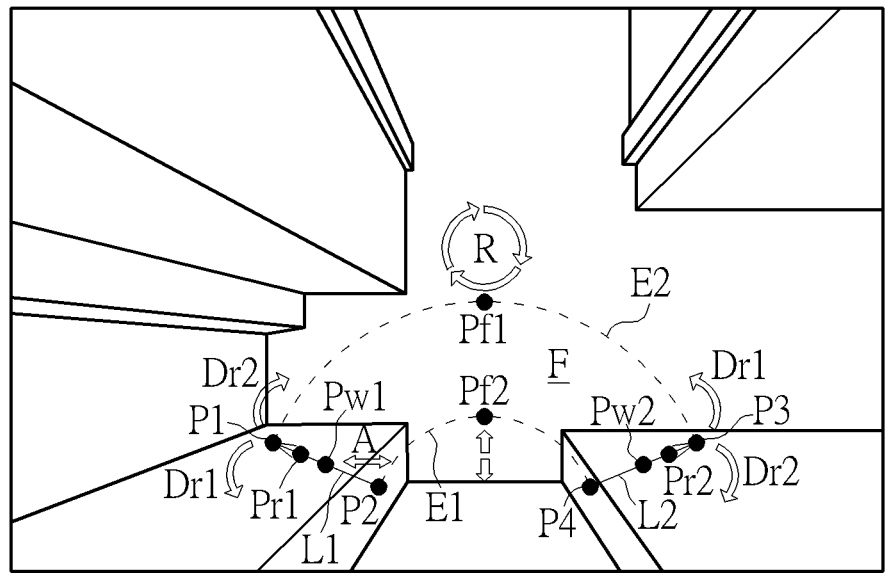

Please refer to FIG. 12 and FIG. 13. FIG. 12 and FIG. 13 respectively are application diagrams of the counting flow path setting method according to different embodiments of the present invention. As shown in FIG. 12, while the counting flow path F is applied to count an amount of the object passing through a hallway, the user can vary the orientation of the rotary control vector R to adjust the rotary angle of the counting flow path F on the video frame I, or vary the first width control point Pw1 and the second width control point Pw2 to adjust the interval between the boundaries of the counting flow path F. The covering range and an aspect of the adjusted counting flow path F adjusted by the setting method of the present invention can be matched with the any-shaped monitoring area no matter what hallway the monitoring area belongs to, such like the straight hallway or the corner hallway. As shown in FIG. 13, while the counting flow path F is applied to an entrance, the first angle control point Pr1 and the second angle control point Pr2 can be varied to adjust the angle formed between the boundaries on the counting flow path F, and the counting flow path F is able to completely cover any possible path while the object passes through the entrance. The first length control point Pf1 and the second length control point Pf2 on the counting flow path F further can be adjusted to increase a sensitivity of flow rate analysis about the counting flow path F by condensing the length of the counting flow path F (such as condensing a distance between the first length control point Pf1 and the second length control point Pf2), or to decrease the sensitivity of flow rate analysis about the counting flow path F by enlarging the length of the counting flow path F.

Figure 14:
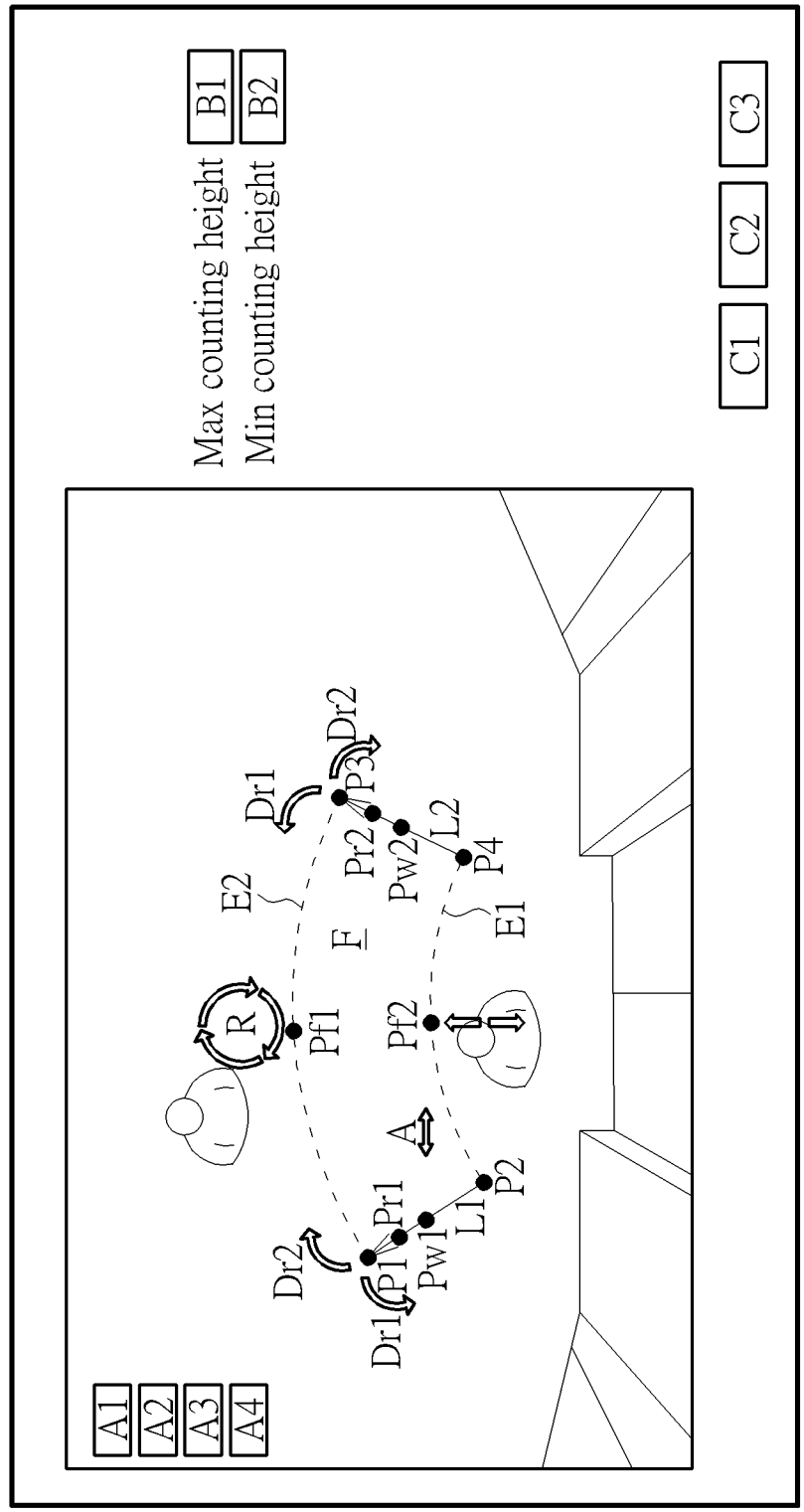
FIG. 14 is an interface diagram where the counting flow path setting method is applied according to another embodiment of the present invention.

Please refer to FIG. 14. FIG. 14 is an interface diagram where the counting flow path setting method is applied according to another embodiment of the present invention. The image capturing device 12 preferably can be a stereo camera with two lenses. The stereo camera not only can detect an amount of the object passing the monitoring area, but also can detect a height of the passed object. As shown in FIG. 14, the interface has two object height inspection frames B1 and B2, the user can input the maximal height of the object into the inspection frame B1 and input the minimal height of the object into the inspection frame B2, so that the stereo camera can count the number of object which passes through the counting flow path F and has a contour height ranged between foresaid input parameters. A counting result can be immediately displayed on indication frames A1~A4 within the interface. For example, the indication frame A1 may display the current number of object entering a below edge of the frame and passing through the counting flow path F, the indication frame A2 may display the total number of object which enters the below edge of the frame and passes through the counting flow path F, the indication frame A3 may display the current number of object entering an above edge of the frame and passing through the counting flow path F, and indication frame A4 may display the total number of object which enters the above edge of the frame and passes through the counting flow path F.

In addition, the interface may have a storage button C1, a shutdown button C2 and a reset button C3. The storage button C1 is clicked to store reference information related to the counting flow path F, and the reference information can be transmitted to the image capturing device 12 for computation. The shutdown button C2 is clicked to shut down the interface. The reset button C3 is clicked to adjust the reference information (such like position of the endpoints P1, P2, P3 and P4 on the two boundaries L1 and L2) related to the counting flow path F as initial predetermined values. Amounts, functions and arrangement of the indication frames and the functional buttons are not limited to the above-mentioned embodiment, and a detailed description is omitted for simplicity.

In conclusion, the present invention provides the setting method applied to the counting flow path. The setting method utilizes the plurality of angle control points, length control points, width control points and/or the rotary control vector to adjust the covering range of the counting flow path on the video frame. The video frame is correlative to the monitoring area monitored by the image monitoring system and the related stereo camera. The user can arbitrarily adjust the dimensions, the shape, and the sensitivity of the counting flow path in accordance with practical environment of the monitoring area, so as to effectively increase product operation convenience.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A setting method applied to a counting flow path, the counting flow path being utilized to determine whether an object passes through a monitoring area, the setting method comprising:
   drawing two boundaries on a video frame correlative to the monitoring area to define the counting flow path;
   detecting relative position between a first angle control point and a second angle control point on the counting flow path;
   adjusting an angle formed by virtual lines stretching from the two boundaries according to the relative position between the first angle control point and the second angle control point; and
   utilizing an initial point and a final point detected by the counting flow path while the objects moves into and out of the counting flow path to determine whether the object passes through the counting flow path.

2. The setting method of claim 1, wherein a covering range of the counting flow path relative to the video frame is varied by a step of adjusting the angle formed by the virtual lines stretching from the two boundaries.

3. The setting method of claim 1, wherein the setting method utilizes corresponding endpoints of the two boundaries to define an inlet border and an outlet border, and the inlet border is greater than, smaller than or equal to the outlet border in accordance with a step of adjusting the angle formed by the virtual lines stretching from the two boundaries.

4. The setting method of claim 1, further comprising:
   detecting a movement of a first length control point relative to a second length control point on the counting flow path; and
   adjusting lengths of the two boundaries according to the movement between the first length control point and the second length control point.

5. The setting method of claim 4, wherein the second length control point is immovable or synchronously moved opposite to a moving direction of the first length control point while the first length control point is moved relative to the second length control point.

6. The setting method of claim 4, wherein a sensitivity of flow rate analysis of the counting flow path is controlled by a step of adjusting the lengths of the two boundaries.

7. The setting method of claim 1, further comprising:
detecting a movement of a first width control point relative to a second width control point on the counting flow path; and
adjusting an interval between the two boundaries according to the movement between the first width control point and the second width control point.

8. The setting method of claim 1, further comprising:
detecting an orientation of a rotary control vector on the counting flow path; and
adjusting a rotary angle of the counting flow path relative to a reference point on the video frame according to the orientation.

9. The setting method of claim 1, further comprising:
detecting whether any pixel of the counting flow path within the video frame is selected and shifted via an input device; and
adjusting a position of the counting flow path on the video frame according to a shifting command generated by the input device.

10. An image monitoring system with a setting function applied to a counting flow path, the counting flow path being utilized to determine whether an object passes through a monitoring area, the image monitoring system comprising:
an image capturing device adapted to capture a video frame;
an input device adapted to input a control command upon a pattern on the video frame; and
an operational controlling device electrically connected to the image capturing device and the input device, the operational controlling device being adapted to set criteria of judgment about the counting flow path on the video frame by steps of drawing two boundaries on a video frame correlative to the monitoring area to define the counting flow path, detecting relative position between a first angle control point and a second angle control point on the counting flow path, adjusting an angle formed by virtual lines stretching from the two boundaries according to the relative position between the first angle control point and the second angle control point, and utilizing an initial point and a final point detected by the counting flow path while the objects moves into and out of the counting flow path to determine whether the object passes through the counting flow path.

11. The image monitoring system of claim 10, wherein a covering range of the counting flow path relative to the video frame is varied by a step of adjusting the angle formed by the virtual lines stretching from the two boundaries.

12. The image monitoring system of claim 10, wherein the operational controlling device is further adapted to utilize corresponding endpoints of the two boundaries to define an inlet border and an outlet border, and the inlet border is greater than, smaller than or equal to the outlet border in accordance with a step of adjusting the angle formed by the virtual lines stretching from the two boundaries.

13. The image monitoring system of claim 10, wherein the operational controlling device is further adapted to detect a movement of a first length control point relative to a second length control point on the counting flow path, and to adjust lengths of the two boundaries according to the movement between the first length control point and the second length control point.

14. The image monitoring system of claim 13, wherein the second length control point is immovable or synchronously moved opposite to a moving direction of the first length control point while the first length control point is moved relative to the second length control point.

15. The image monitoring system of claim 13, wherein a sensitivity of flow rate analysis of the counting flow path is controlled by a step of adjusting the lengths of the two boundaries.

16. The image monitoring system of claim 10, wherein the operational controlling device is further adapted to detect a movement of a first width control point relative to a second width control point on the counting flow path, and to adjust an interval between the two boundaries according to the movement between the first width control point and the second width control point.

17. The image monitoring system of claim 10, wherein the operational controlling device is further adapted to detect an orientation of a rotary control vector on the counting flow path, and to adjust a rotary angle of the counting flow path relative to a reference point on the video frame according to the orientation.

18. The image monitoring system of claim 10, wherein the operational controlling device is further adapted to detect whether any pixel of the counting flow path within the video frame is selected and shifted via an input device, and to adjust a position of the counting flow path on the video frame according to a shifting command generated by the input device.

19. A non-transitory computer readable medium having a plurality of computer-executable commands, the command being adapted to drive a computer to execute steps of drawing two boundaries on a video frame correlative to the monitoring area to define the counting flow path, detecting relative position between a first angle control point and a second angle control point on the counting flow path, adjusting an angle formed by virtual lines stretching from the two boundaries according to the relative position between the first angle control point and the second angle control point, and utilizing an initial point and a final point detected by the counting flow path while the objects moves into and out of the counting flow path to determine whether the object passes through the counting flow path.

20. The non-transitory computer readable medium of claim 19, wherein the command of the non-transitory computer readable medium is further adapted to detect a movement of a first length control point relative to a second length control point on the counting flow path, and to adjust lengths of the two boundaries according to the movement between the first length control point and the second length control point.

* * * * *